May 6, 1952 A. A. STUDLER 2,595,424
ANGLE COMPUTER AND WORK HOLDER
Filed Aug. 6, 1945 3 Sheets-Sheet 1

AURELE A. STUDLER,
INVENTOR.

BY
ATTORNEY

May 6, 1952     A. A. STUDLER     2,595,424

ANGLE COMPUTER AND WORK HOLDER

Filed Aug. 6, 1945     3 Sheets-Sheet 2

AURELE A. STUDLER,
INVENTOR.

BY

ATTORNEY

May 6, 1952     A. A. STUDLER     2,595,424
ANGLE COMPUTER AND WORK HOLDER
Filed Aug. 6, 1945     3 Sheets-Sheet 3

AURELE A. STUDLER,
INVENTOR.

BY
ATTORNEY

Patented May 6, 1952

2,595,424

UNITED STATES PATENT OFFICE 2,595,424

ANGLE COMPUTER AND WORK HOLDER

Aurele A. Studler, Glendale, Calif.

Application August 6, 1945, Serial No. 609,052

6 Claims. (Cl. 90—58)

This invention relates to a machine or instrument capable of being used as an angle indicator or computer in checking up "work" such as machine parts, and also for checking the measurements of the same. The instrument can also be used for laying out the work to be performed on machine parts that are to be finished on machine tools, and the machine can also be employed as a support to hold "work" such as a machine part in a position to be worked upon by machine tools, grinders, or the like.

One of the objects of the invention is to produce an instrument of this character which is compact in construction and capable of supporting the "work" or machine piece so that the same can be oriented about several axes of orientation, and securely held in any position into which the machine piece has been oriented about the axes of reference.

Another object of the invention is to construct the instrument so that the platen carrying the work can be quickly and securely clamped up in its oriented position with reference to the axes referred to, and held securely by the instrument in that position.

In its preferred embodiment the instrument includes an elbow which is interposed between the base of the instrument and the platen that carries the work, and one of the objects of the invention is to provide improved means for mounting the elbow for rotation on a vertical axis on the base; and for clamping it securely in any adjusted oriented position it may assume.

Another object is to provide a mounting for the elbow on the base which will facilitate the incorporation into the instrument of the clamping means for clamping the elbow rigidly to the base; also to locate the said clamping means in such a way that the clamping forces developed in clamping up the instrument on the vertical axis will not develop any stresses in the instrument that will interfere with the proper functioning of the instrument in its orientation about two axes on which the elbow rotates or provides rotation for itself and for the platen.

In its preferred form the instrument includes a clamping post or bolt on the axis of which the pillow-block of the instrument can be oriented. And one of the objects of the invention is to provide improved means associated with this clamping bolt which will adapt it to be operated by a handle or lever having a relatively small amount of swinging movement in the angle between the trunnions and bearings for the elbow.

Further objects of the invention will appear hereinafter.

The invention consists in the novel parts and combinations of parts to be described hereinafter, all of which contribute to produce an efficient angle indicator and work holder.

A preferred embodiment of the invention is described in the following specification, while the broad scope of the invention is pointed out in the appended claims.

Figure 1:
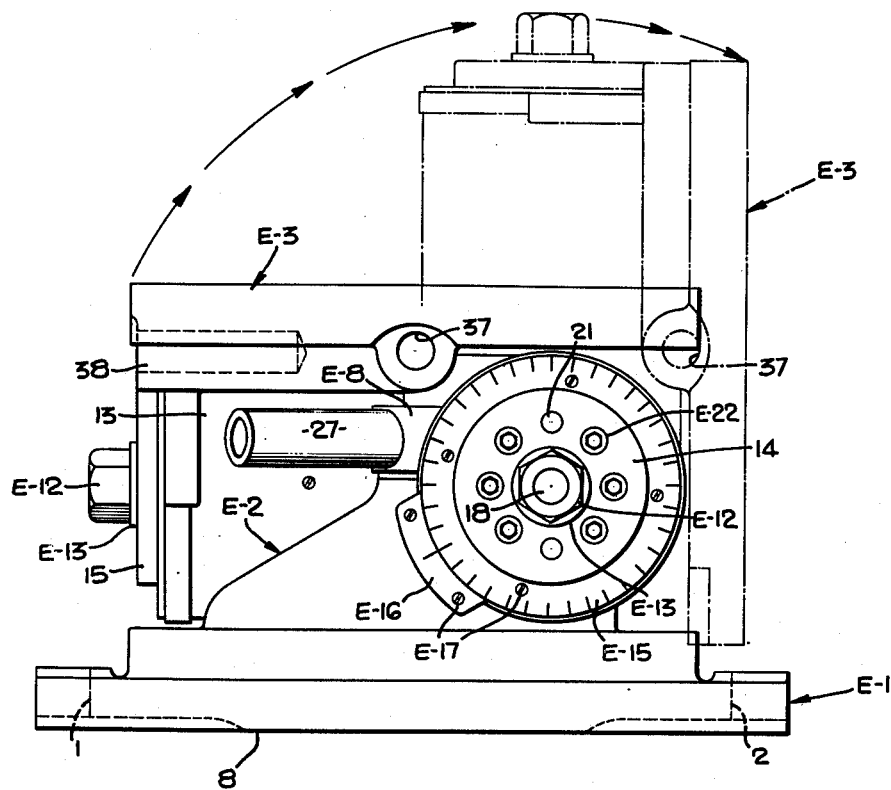
Figure 1 is a side elevation of the machine or instrument embodying this invention.

Referring more particularly to the parts, this instrument preferably includes an oblong base E-1 which is provided at its ends with open sockets 1 and 2 to receive holding down bolts.

Preferably at the geometric center of this base, its upper face is provided with a shallow bore 3 that operates as a seat for a pillow-block E-2 which is rotatable on the vertical axis A, which is, of course, the central axis of the cylindrical bore 3.

In practicing my invention I provide an elbow 4 which is mounted for adjusting rotation or orientation on the pillow-block E-1 at a main bearing about a horizontal axis, and on this elbow I mount a platen E-3 for orientation at a platen-bearing about an axis that is disposed at right angles to the axis on which the elbow is rotatable on the pillow-block. In other words, in addition to the vertical axis A, there are two other axes about which the platen E-3 can be rotated for adjusting the position of the platen, which two axes are at right angles to each other and located in the same plane.

In order to accomplish this I prefer to form a main bearing-member 5 integral with the pillow-block, having a bore 6 on a horizontal axis B; that is to say, the axis B is parallel to the true plane surface 8 forming the bottom surface of the base E-1. In the present instance this bearing-member is in the form of a bearing 5 of sleeve form that receives a wrist-pin or journal 9 projecting from the body 10, which extends into the bearing 5 from its inner end, and the body 10 of the elbow E-4 is preferably formed with a conical shoulder 9a that seats upon a corresponding conical seat 12 formed on the inner end of this bearing.

Figure 4:
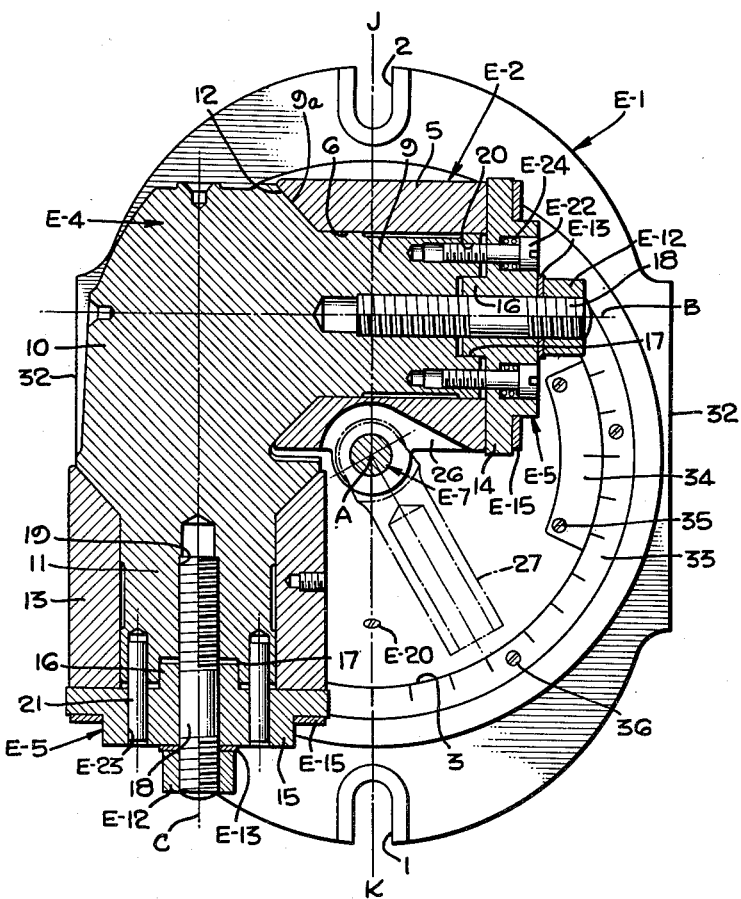
Figure 4 is a horizontal section taken on the line 4—4 of Figure 3.

The elbow E-4 has a wrist-pin or journal 11 that is constructed like the journal 9 but with its axis C extending at right angles to the axis B of the journal 9, and in the same plane therewith as indicated most clearly in Figure 4. And on the wrist-pin or journal 11 a bearing 13 is mounted which is formed integrally with, and extends down from, the underside of the platen E-3.

The bearings 5 and 13 are provided with bearing caps 14 and 15 respectively which are alike in construction. Each of these caps is provided with a bushing or central sleeve 16 on its inner face that is received in a counterbore 17 formed in the outer end of each of the journals. And in addition to this, each cap has an axial opening through it to enable it to be received over a clamping post or stud 18 having a threaded inner end that is fixed in a threaded socket 19. The outer ends of these clamping studs 18 have threads to receive clamping nuts E-12 respectively, which may seat against a washer E-13 seating on the outer face of each cap.

I provide means for resiliently pressing the caps against the ends of their bearings, for which purpose I provide a plurality of machine screws E-22 which are received in tapped sockets 20. The heads of these machine screws fit nicely in counterbores for them, and under their heads coil springs E-24 are placed, the inner ends of which press against the bottoms of these counterbores. In the present illustration I show these machine screws as composed of two sets disposed diametrically opposite to each other, and between these two sets I provide dowels 21, as illustrated in the lower portion of Figure 4, that are secured in the end faces of the journals or wrists 9 and 11. The caps are provided with drilled openings E-23 to fit over these dowels. This insures that the caps can always be replaced in the proper position to enable the scales carried thereby to be always in the same relation to a zero mark on the parts with which they cooperate.

These scales will now be described. The manner of mounting them on the caps is the same for both caps. Each of the caps 14 and 15 has its greatest thickness in its middle area so as to present a boss or body E-5 that centers the scale E-15. Each scale E-15 is in the form of a ring with equidistant radial graduation marks, and held in place on its seat at the edge of the cap by small screws such as the screws E-17 shown in Figure 1. The graduation marks on each scale E-15 cooperate with a zero line on an arcuate plate such as the plate E-16 shown in Fig. 1, that is secured in place alongside of each scale by means of similar small screws E-17, as shown in Figure 1.

When the scale carried by the cap 14 of the wrist or journal 9 is indicating "zero," then the axis C of the other wrist 11 lies in a horizontal plane. Likewise, when the scale on the cap 15 indicates zero, then the upper face of the platen E-3, which is a true surface, will be exactly in a horizontal plane, if the axis C is horizontal.

Figure 3:
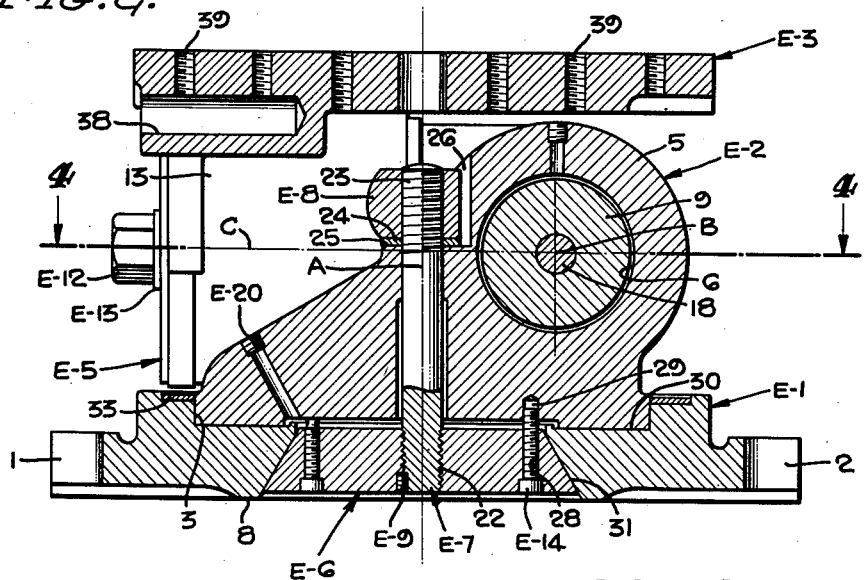
Figure 3 is a vertical section taken on the line 3—3 of Figure 2.

As indicated by the dotted lines in Figure 1, if the elbow E-4 is rotated on the axis of the bearing 5 while the platen E-3 is in its horizontal position, as in Figure 3, the true face of the platen can be brought into a vertical plane. At this time the scale for this bearing will read 90°. However, no stop is provided at this angle for the platen, and I prefer to construct the instrument so that it will permit a swing on the axis of this bearing slightly beyond this point, for example, about 5°. In addition to this, it will be evident that while the wrist 11 is maintained in a horizontal position, it is possible to rotate the platen E-3 on the axis of this wrist, and this rotation permitted by the machine is sufficient to enable the platen to move into a position so that its true surface will be in a vertical plane substantially at right angles to the plane of the true surface indicated in Figure 1. The movement in this direction is also sufficient to enable the swing to be somewhat over 90°, for example, 5°.

It should be understood that the wrists or journals fit snugly in their bearings, and even when their clamping nuts E-12 are loosened up, they still will be friction tight, that is to say, the bearing 5 will be sufficiently tight on the wrist 9 to hold the wrist 11 at any angle to which it has been elevated; and the bearing 13 will be sufficiently tight on the wrist 11 to maintain the platen E-3 in any position it may have assumed. This friction is developed by tightening up machine screws E-22 mounted in threaded sockets 20 in the ends of the journals 9 and 11. This is illustrated at the upper part of Fig. 4. Coil springs E-24 under the heads of these screws afford means for holding the caps friction tight against the ends of the bearing sleeves 5 and 13. At two diametrically opposite points two sockets E-13 are provided in the caps to fit over two centering dowels 21 as indicated at the lower part of Fig. 4.

In adjusting the platen E-3 to any desired compound angle by orienting the same around the axis C and the axis B, the true face of the platen E-3 can be moved into any position desired, after which the clamping nuts E-12 can be tightened up so as to force the bearings 5 and 13 firmly back against the inclined seats for their tapered inner ends. In this way they can be clamped rigidly in adjusted positions.

An instrument having two axes of rotation such as the axes C and B, as described above, enables an angle to be measured about two axes at right angles to each other. And a machine having these capabilities and characteristics may be employed if desired.

However, I prefer to mount the pillow-block E-2 so that it can be rotated about the vertical axis A, and clamped in any desired oriented position. In order to accomplish this I mount a clamping bolt or post E-7 in a drilled opening on the vertical axis or orientation A (see Figure 3), and the lower end of this clamping post or bolt carries a head capable of being clamped within the base E-1. For this purpose I prefer to provide an enlarged head E-6 that is rigidly attached to the lower end of the post E-7. In the present instance it is attached by means of a screw thread 22. After the head E-6 is seated on the thread, and screwed home, then a locking screw E-9 is screwed into a socket in the head and partly in the lower end of the clamping bolt to function as a key to lock these two parts securely against relative rotation. The upper end of the clamping bolt E-7 is formed with threads 23 to receive a clamping nut E-8. This nut may seat, if desired, on a shim or washer 24 that in turn seats on a horizontal seat 25 in the upper portion of the pillow-block. This seat is formed by cutting a recess 26 down into the material of the pillow-block from above.

The nut E-8 is actually a head formed on a lever or arm 27 that projects outwardly in the angle formed between the two bearings 5 and 13, as indicated in Figure 4 when the two wrists 9 and 11 are horizontal. This arm or lever 27 may be of tubular form as indicated in the drawing so as to permit the end of a long bar or lever to be inserted to give a good leverage in clamping up the pedestal block when securing it in any oriented position around its axis A.

In order to insure that this arm 27 can always be swung in the clear, in tightening up the pedestal block, I provide means for effecting an orienting adjustment of the head E-6 on the axis A. For this purpose I provide a screw E-14 which in Figure 3 is shown mounted in a threaded opening 28 in the clamping head E-6 and this screw extends on up into a plain socket 29 in the underside of the pedestal block E-2. A plurality of these threaded openings 28 are provided in the head E-6 and any one of them can be made to register with the threaded socket 29 in the underside of the pedestal block. These threaded sockets 28 are spaced equidistant on their pitch circle. This enables slight adjustments in degrees to be made in either direction. In this way no matter what the level of the thread 23 is, an adjustment can always be made at the head E-6 to insure that the arm or lever 27 will swing in the clear, so that it can clamp up the pedestal block. The clamping head E-6 may be constructed in any manner which will enable it to clamp the pedestal block firmly to its seat 30 at the bottom of the bore 3. In the present instance the head E-6 is formed with a conical outer face 31 that seats on a similarly formed seat or bore in the base E-1.

The base E-1, as indicated in Figure 4, is provided with two longitudinally disposed side faces 32 located exactly in a vertical plane parallel with the axis J—K indicated in Figure 3.

The base E-1 is provided with a scale ring 33 graduated with radial divisions with respect to the axis 4, and these radial divisions cooperate with a fixed plate 34 attached to the pedestal block by means of suitable screws 35. The ring scale 33 is attached by similar small screws 36 to the base. When the scale 33 indicates zero, the axis J—K will be parallel to the true vertical surfaces 32; at the plate 34 any degree of orientation of the pillow-block on the axis 4 can be read.

In order to facilitate swinging the platen up into different positions it is provided on two of its edges with sockets such as the sockets 37 and 38 (see Figure 1). By inserting the end of a lever in either of these sockets, the platen can be rotated about axes of either of the wrists 9 and 11.

Figure 2:
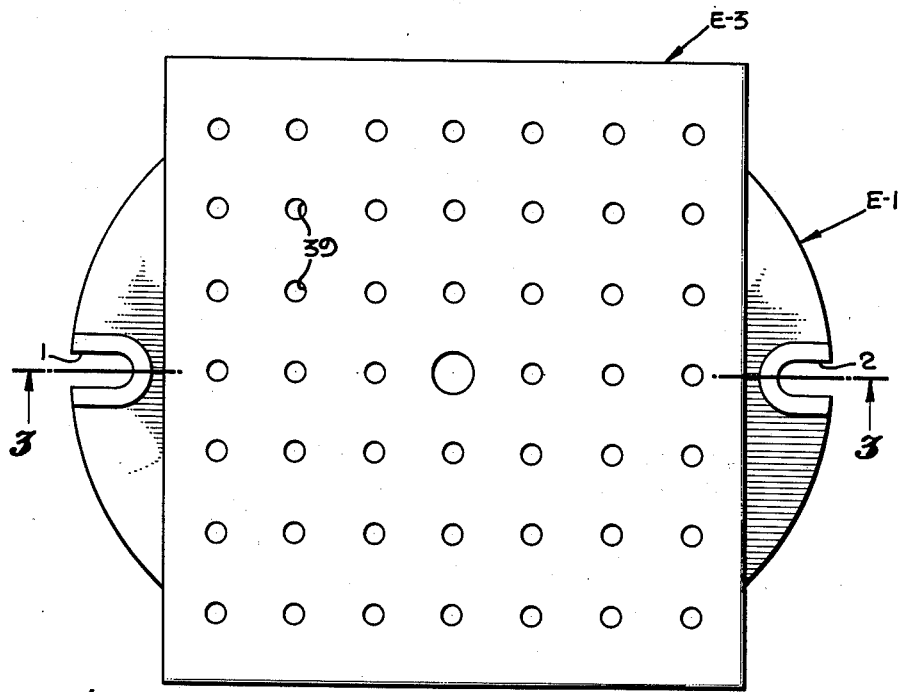
Figure 2 is a plan of the machine illustrated in Figure 1.

The platen E-3 should be a plate of considerable mass so that it will not become distorted when heavy castings are secured to it. This would, of course, be effected by means of holding down bolts that may be mounted in equidistant threaded sockets 39 distributed as indicated in Figure 2 on the upper face of the platen.

Many other embodiments of this invention may be resorted to without departing from the spirit of the invention.

I claim as my invention:

1. In an angle computer and work holder, the combination of a base adapted to rest on a horizontal supporting face, a pillow block mounted on said base for rotation on a vertical axis, and having a main bearing member rigid therewith disposed on a horizontal axis offset laterally from said vertical axis, an elbow having a body with a main bearing member projecting therefrom, fitting to said first named bearing member and cooperating therewith to provide a horizontal axis of rotation for the elbow, said elbow having a second bearing member extending therefrom, the axis whereof is disposed in the same plane as the axis of the first named bearing member and at right-angles thereto, a platen having a platen-bearing member on its under side fitting to said last named bearing member and cooperating therewith to form an axis of rotation for the platen, said elbow capable of assuming a position in which the axis of the platen bearing is horizontal, said platen having a true platen face disposed in a horizontal position when the axis of said platen bearing is horizontal, means for clamping up said horizontal bearing and said platen bearing in different angular adjusted positions to enable the platen face to be secured at any compound angle determined by the adjusted clamped-up positions of said bearings.

2. In an angle computer and work holder, the combination of a base adapted to rest on a horizontal supporting face, a pillow block mounted on said base for rotation on a vertical axis, and having a main bearing member rigid therewith disposed on a horizontal axis offset laterally from said vertical axis, an elbow having a body with a main bearing member projecting therefrom, fitting to said first named bearing member and cooperating therewith to provide a horizontal axis of rotation for the elbow, said elbow having a second bearing member extending therefrom, the axis whereof is disposed in the same plane as the axis of the first named bearing member and at right-angles thereto, a platen having a platen-bearing member on its under side fitting to said last named bearing member and cooperating therewith to form an axis of rotation for the platen, said elbow capable of assuming a position in which the axis of the platen bearing is horizontal, said platen having a true platen face disposed in a horizontal position when the axis of said platen bearing is horizontal, and a clamping stem extending up from the base for securing the pillow block to the base, and located in the angle between said horizontal bearings when the axis of the platen bearing is horizontal, means associated with said stem for clamping the pillow block to the base in adjusted positions, and means for clamping up said horizontal bearing and said platen bearing in different angular adjusted positions to enable the platen face to be secured at any compound angle determined by the adjusted clamped-up positions of said bearings.

3. An angle computer and work holder according to claim 2, in which the stem is threaded at its upper end; and including a clamping nut on its thread, and means for holding the said clamping stem fixed in different oriented set positions about its own axis, to enable the arc of swing of said nut arm in clamping up the pillow-block, to be operated in the clear in the angle between said bearings when the platen bearing is located with its axis in a horizontal plane.

4. In an angle computer and work holder, the combination of a base adapted to rest on a horizontal supporting face, a pillow block mounted on said base for rotation on a vertical axis, and having a bearing rigid therewith disposed on a horizontal axis offset laterally from said vertical axis, an elbow composed of a body having a main journal integral therewith rotatably mounted in the said bearing, and including a second journal constituting a platen-journal the axis whereof is in the same plane as the axis of the first named journal and extends at right angles to the same, a platen having a true platen-face disposed in a plane at a higher level than the platen journal and having an integral bearing mounted on the platen-journal; means for clamping said pillow block to said base in any adjusted position about said vertical axis; and means for securing said journals in their bearings in a position in which the axis of the platen journal is horizontal so that said platen-face is disposed in a true horizontal plane, said means being capable of securing said journals in their bearings in adjusted positions to enable said platen-face to be held at any compound angle, determined by the adjusted positions of both of said journals.

5. An angle computer and work holder according to claim 4, in which the said elbow is formed with conical shoulders at the inner ends of the said journals, and in which the bearings are formed with conical seats for said shoulders, caps on the outer ends of said journals seating against the outer ends of the bearings, and means mounted in the ends of said journals for pressing against said caps to clamp the conical shoulders against said conical seats, and hold the journals fixed against rotation in their bearings.

6. An angle computer and work holder according to claim 4, in which the said elbow is formed with conical shoulders at the inner ends of the said journals, and in which the bearings are formed with conical seats for said shoulders, caps on the outer ends of said journals seating against the outer ends of the bearings, resilient means associated with said caps for pressing the same against the outer ends of said bearings so as to normally develop a relatively light frictional force at said conical seats to offer a yielding resistance to the rotation of the journals in their bearings, and means mounted in the ends of said journals for pressing against said caps to clamp the conical shoulders of the bearings securely against said conical seats.

AURELE A. STUDLER.

REFERENCES CITED

The following references are of record in the file of this patent:

UNITED STATES PATENTS

| Number | Name | Date |
|---|---|---|
| 292,927 | Lipe | Feb. 5, 1884 |
| 1,414,970 | Nelson | May 2, 1922 |
| 1,703,017 | Singer | Feb. 19, 1929 |
| 2,214,166 | Hertleim | Sept. 10, 1940 |
| 2,351,246 | Walling | June 13, 1944 |
| 2,356,003 | Polk | Aug. 15, 1944 |
| 2,452,089 | Wiken | Oct. 26, 1948 |

OTHER REFERENCES

Publ.: American Mach., June 10, 1943, page 282.